US008006275B1

(12) United States Patent  (10) Patent No.: US 8,006,275 B1
Poole et al.  (45) Date of Patent: Aug. 23, 2011

(54) NETWORK PLAYBACK OF VIDEO PROGRAMMING AFTER CUSTOMER PREMISES SERVICE INTERRUPTION

(75) Inventors: R. Andrew Poole, Round Hill, VA (US); Robert D. Farris, Sterling, VA (US)

(73) Assignee: Verizon Communications, Inc., New York, NY (US)

( * ) Notice: Subject to any disclaimer, the term of this patent is extended or adjusted under 35 U.S.C. 154(b) by 957 days.

(21) Appl. No.: 11/215,014

(22) Filed: Aug. 31, 2005

(51) Int. Cl.
 *H04N 7/173* (2011.01)
(52) U.S. Cl. ............... 725/96; 725/14; 725/58; 725/87; 725/93; 725/94
(58) Field of Classification Search .................... 725/58, 725/87, 93, 94, 14
See application file for complete search history.

(56) References Cited

U.S. PATENT DOCUMENTS

| | | | |
|---|---|---|---|
| 4,912,552 A * | 3/1990 | Allison et al. .................. | 725/21 |
| 5,682,325 A | 10/1997 | Lightfoot et al. | |
| 5,864,415 A | 1/1999 | Williams et al. | |
| 5,880,864 A | 3/1999 | Williams et al. | |
| 6,611,654 B1 | 8/2003 | Shteyn | |
| 6,829,781 B1 | 12/2004 | Bhagavath et al. | |
| 6,898,276 B1 | 5/2005 | Millet et al. | |
| 6,904,054 B1 | 6/2005 | Baum et al. | |
| 7,103,906 B1 * | 9/2006 | Katz et al. ......................... | 725/87 |
| 7,149,415 B2 * | 12/2006 | Thiagarajan et al. ......... | 386/113 |
| 7,636,544 B2 * | 12/2009 | Yamada et al. ............. | 455/3.01 |
| 2003/0097659 A1 * | 5/2003 | Goldman ....................... | 725/89 |
| 2003/0192054 A1 | 10/2003 | Birks et al. | |
| 2005/0120377 A1 | 6/2005 | Carlucci et al. | |
| 2005/0144640 A1 | 6/2005 | Fritsch et al. | |

* cited by examiner

*Primary Examiner* — Scott Beliveau
*Assistant Examiner* — Kunal Langhnoja

(57) ABSTRACT

In an exemplary broadband video distribution network, an edge interface device at the customer premises detects a condition relating to an interruption of video service, e.g. a power outage at the premises. The interface device notifies the network, to allow identification of the point of interruption and the program being viewed. Upon resumption of service, the network offers to provide a replay of the program, starting from a point substantially corresponding to the point of interruption. If the program was pre-recorded (e.g. from a VOD server) or was automatically recorded in the network as part of another service, the replay is provided as a narrowcast transmission from the appropriate source starting at about the point of interruption. If the viewer was watching a broadcast program not otherwise recorded, it may also be necessary to activate recording of the program in a network video recorder, in response to the interruption.

26 Claims, 4 Drawing Sheets

NETWORK PLAYBACK OF VIDEO PROGRAMMING AFTER CUSTOMER PREMISES SERVICE INTERRUPTION

TECHNICAL FIELD

The present subject matter relates to techniques and equipment to detect an interruption, e.g. a power outage, that disrupts a video program viewing capability at a customer premises, and provide a replay of the program that was being viewed, from a point in the program substantially corresponding to the point of interruption, when video service resumes.

BACKGROUND

Video or television type programming is an extremely popular form of entertainment as well as a medium for distribution of news and other information. Video programming includes images, typically representing real-time variable or moving imagery, usually with associated audio information. TV viewing of such material has become ubiquitous throughout the United States and much of the rest of the world. Distribution technology is rapidly evolving from analog over-the-air broadcasts to digital technologies using satellite or optical fiber communications.

Conventional transmission facilities continually broadcast the video material on a given channel. In digital networks, for example, customer premises equipment or network switching equipment allows subscribers to select video programs from a set of broadcast program materials. Once selected, a decoder receives the data stream of video material in a continuous downstream data feed and processes the data feed for presentation of the video program to the viewer via a television set or monitor. In broadcast systems, video on demand (VOD) and pay-per-view (PPV) services permit users to select a broadcast channel transmitting a movie or other program material for viewing at a time of the user's choice. The program is selected at the viewer's home, and the program is received at a designated, scheduled time.

Video recorders were developed to provide viewers with increased flexibility, for example, to record a broadcast program for later viewing (time shifting) or to record and keep a copy of a favored program (archival recording). Consumer devices for video recording have evolved from the analog video cassette recorder or "VCR" that utilizes magnetic tape to digital video recorders or "DVRs" that utilize hard disk drives, optical disks or the like. In addition to traditional programmed recording of selected video materials, a DVR, also sometimes referred to as a "personal video recorder" or "PVR," offers enhanced capabilities of "pausing," "rewinding" and "fast-forwarding" live television (TV) broadcast while it is being recorded. Examples of such devices include TiVo and ReplayTV.

Situations occur when events at the customer premises may interrupt video service. For example, when the commercial power to the premises goes out, the video equipment can no longer provide television viewing to the customers at the effected location(s). Existing analog and digital recording devices can not address this issue, as they typically suffer the same cause(s) of service interruption.

Recently, there have been proposals to utilize network servers to record video information, in a manner so as to offer digital recording as a service to network customers. Such systems, sometimes referred to as "network personal video recorders" or "NPVRs," offer capabilities very similar to DVRs or PVRs but without the requirement for each user to purchase and install a recording device of their own within the customer premises. Examples of NPVRs or similar server implemented video recording services are described in U.S. Pat. No. 6,611,654, and in US Patent Application Publications Nos. 2003/0192054, 2005/0120377, 2005/0144640. Although server-centric recording equipment would typically not be subject to localized events causing video service interruptions at individual customer premises, such as power outages, proposals for this type of service have not addressed problems caused by localized service interruptions.

U.S. Pat. No. 6,829,781 discloses a technique for creating summaries of broadcast programming, either in a set-top box at the customer premises or in a server in a data communication network. Of note, one use of the summary functions is to provide a viewer a summary of a program, when viewing of the program is interrupted. However, the summary service is driven by user inputs. For example, the user must interact with the set-top box or the server to request creation of a summary of a program, viewing of which will be interrupted, while the user is absent from the television receiver. The viewer must request the summary creation prior to the interruption. The viewer has the option to view the summary or return to the program channel, when the viewer returns to the television receiver. This approach records a summary in the form of audio, still images and possible segments of the video imagery, but it apparently does not record the actual video program. Also, by requiring the user to initiate the creation of the summary, this approach can not automatically detect service interruptions and can not address issues related to power or other unexpected localized interruptions of video service at or within the premises. If video service is out, with respect to the set-top box and/or the user's television, e.g. due to a power outage, the user can not interact with the service to request creation of the summary.

Hence a need exists for a system and methodology to provide a video recording service, to automatically provide a replay from an appropriate point interrupted programming, in response to localized service interruptions, such as may be caused by power outages.

SUMMARY

The teachings herein alleviate one or more of the above noted problems with prior video distribution and recording technologies.

A recovery method for a video communication service provided through a broadband communications network, might entail monitoring a condition relating to receipt of video information through the network at a device within the customer premises. This enables automatic detection of an interruption impacting on the video communication service within the customer premises. The detected interruption is automatically noted at a node in the network. After communication with the customer premises resumes after an end of the interruption, the method includes transmitting at least a portion of a stored copy of the video program, starting from a point substantially corresponding to when the interruption occurred, through the network to a device within the customer premises, for viewing by a viewer.

For example, an interface device at the edge of the network at or adjacent the customer premises might detect a service interruption due to loss of power at the premises. The interface device notifies a network based video recorder, which records the program that was being viewed in the premises at the time of interruption. If recording was not already in progress for another reason, the recorder begins recording the program from approximately the point/time of the interruption. When video service resumes and the user begins viewing video again, the network offers the viewer an option to receive a replay or playback from storage of the program previously viewed, starting from the point of interruption. If the user accepts this option, the recorder sends the recorded video information, starting at about the interruption point, through the network for presentation to the viewer.

A system for implementing video recovery in event of an interruption might utilize server equipment for connection at a node within the broadband communication network and an interface device for providing a communications interface at an edge of the broadband communication network for the customer premises. The server equipment stores a video program that was being viewed in the customer premises when the interruption occurred. The interface device is configured to detect the interruption and to send a notice message through the network upon detecting the interruption. The server equipment is configured to transmit at least a portion of the stored video program through the network to a device within the customer premises, for viewing by a viewer from the point substantially corresponding to the identified point when the interruption occurred, after service resumes.

The node that provides connection for the server equipment is within the network in that it is part of the broadband network providing services to the carrier's customers. Customer premises equipment is outside of that network domain. The interface device is at the edge of the network in that it is connected to the network at the outer boundary and provides the interconnection between the network domain and the customer premises domain. Examples of the interface device are disclosed, which comprise some network side elements and some customers premises side elements with an internal communication link therebetween.

In the examples, the interface device detects an interruption impacting video service by monitoring the status of power in the customer premises. Typically, the interface device receives normal power from the premises, but it has backup battery available in the event of a power outage. Hence, the interruption can be detected by sensing a switchover to the backup battery, which usually corresponds to a power outage that will also disable video equipment within the customer premises.

The server equipment can take several forms and operate in somewhat different ways, depending on the video services offered through the particular network. If the server offers a video on demand (VOD) service, the server simply resumes VOD video transmission at the appropriate point in the video, after video service through the network resumes.

Other server equipment arrangements involve recording video, e.g. from one or more program broadcasts carried by the network. In one example, a network video recorder (NVR) records the broadcast program being viewed, from the point corresponding to the interruption, in response to notice from the interface device. The NVR transmits the recorded version, that is to say starting from the point corresponding to the interruption, when service resumes. Another recording approach might record a plurality or even record all of the programs broadcast through the network, for example, to offer network customers a time-shifted replay service. If such recordings are already being made on a continuing/regular basis, the replay for the interruption recovery service can use such a recording. Much like the VOD situation, the server would transmit the appropriate program from storage, but starting with a point substantially corresponding to the time of interruption, after service to the premises resumes.

In the examples, the server equipment offers the viewer a choice whether or not to view the program from the point of interruption when service resumes. If the viewer accepts the offer, the server begins the post-interruption transmission of the stored program.

The detailed description also encompasses examples of an interface device for providing a communications interface between a customer premises and a digital broadband communication network, for use in a video recovery service. This device includes a broadband network-side interface for two-way communications connection to a broadband medium at an edge of the digital broadband communication network; and a customer-side interface for connection to a customer premises medium. The customer-side interface provides two-way communication to and from a video device within the customer premises. An internal link provides communications between the broadband network-side interface and the customer-side interface. The interface device also includes a programmable data processing system in communication with the interfaces for controlling at least some communications operations through the interfaces; and programming for controlling operation of the programmable data processing system. The programming causes the interface device to perform steps, including monitoring a condition relating to communications of video information through the network to the video device within the customer premises, to detect an interruption impacting on video service within the customer premises. The interface device sends notice of the detected interruption through the network to a node of the network having a video storage for use in offering a viewer a replay of a program that was being viewed before the interruption.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

An intelligent interface device at edge of network, such as an optical network terminal on/at the customer premises, monitors a parameter related to status of a video session in progress with a set-top box or similar video decoder in the customer premises, to detect an interruption. Typically, the interface device draws power from the customer premises and has a battery back-up. Such an interface device can detect a service interruption within the customer premises, such as loss of power (e.g. when there is a switch-over to the battery back-up). Upon detecting the interruption, the interface device sends notice of the interruption, typically indicating the customer (e.g. by an ID of the interface, the decoder, the premises location or the customer). The notice may identify the point of interruption, e.g. the time of detecting the interruption. In some implementations, the notice may also identify an aspect of one or more in-progress video sessions, such as the program(s) being viewed via one or more set-top boxes operating within the premises at the time of the interruption. The interface device sends the interruption notice message to a network node having or coupled to a device having a digital video storage capability.

The particular program that was being viewed via the session that was in progress when the interruption occurred is identified, e.g. from network connectivity information or access control information, or from a program identification contained in the message. If the program is not a recorded program, e.g. from a video on demand server, and/or the network is not already recording the program, e.g. for another service, then a network video record begins recording the programming in response to the interruption notice. When the interruption is cleared and the set-top box or the like comes back on line, a message is sent and presented to the user, offering the option to resume the program viewing from the point of interruption. If accepted, the element storing the program and the network set-up a new session to the set-top box to allow the user to view the recorded program, approximately from the point of the interruption.

Figure 1:
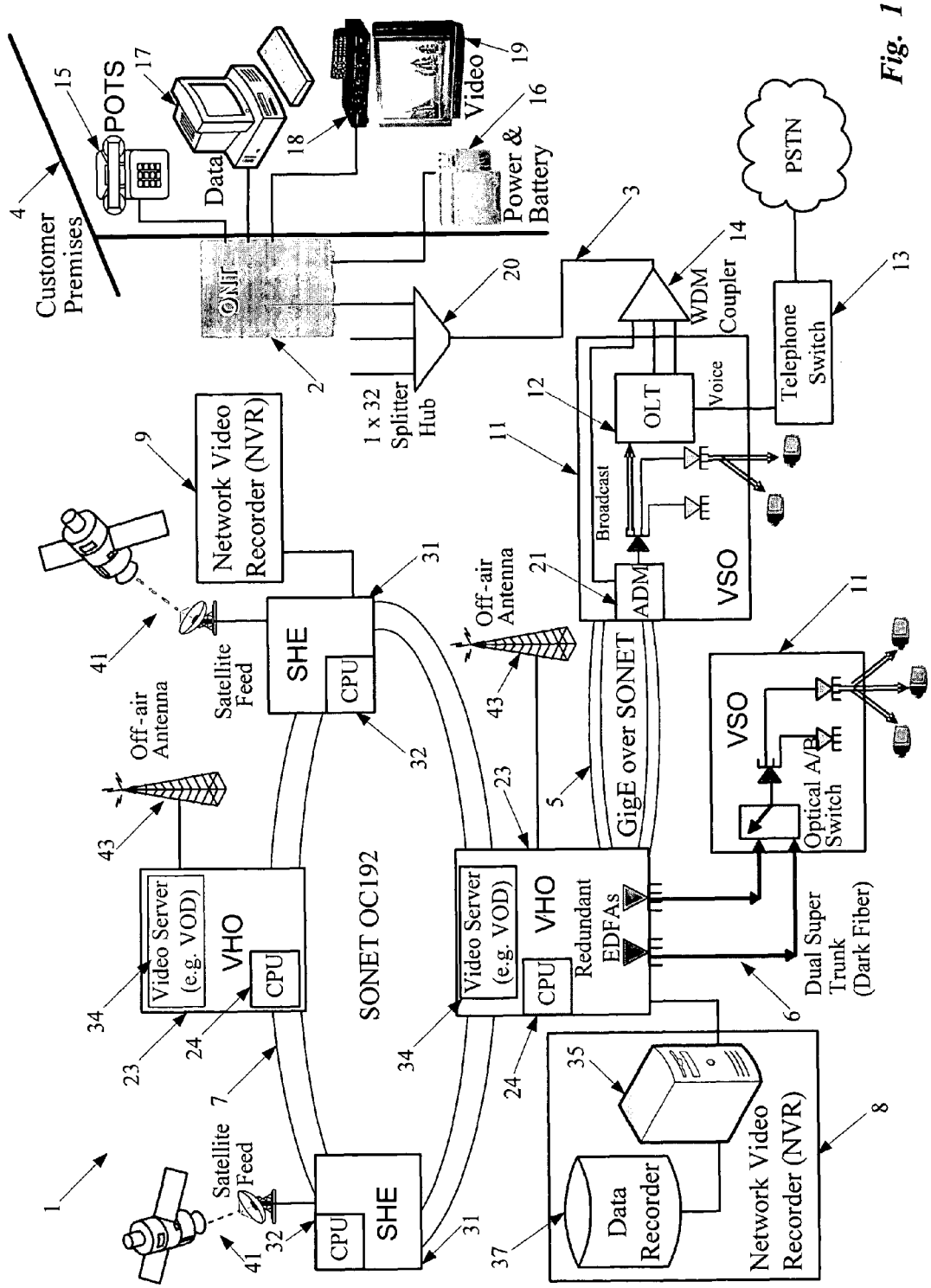
FIG. 1 is a functional block diagram of an optical fiber to the home network, carrying video and other services, which also offers automatic network replay of interrupted video programming responsive to interruption of service in the customer premises.

Reference now is made in detail to the examples illustrated in the accompanying drawings and discussed below. FIG. 1 illustrates the elements of an exemplary network 1 in which this network-centric video recovery-replay service may be offered. FIG. 1 shows a simplified architecture for a fiber to the home or fiber to the building implementation of the network 1. The illustrated network is just one example of a network that can provide digital video services and support video recording as well as playback in response to service interruptions. Those skilled in the art will recognize that the recovery service concepts may be implemented in other video networks, just a few examples of which may be found in U.S. Pat. Nos. 6,904,054, 6,898,276, 5,880,864 and 5,682,325 and/or in US patent application publication 2005/0120377.

The intelligence to implement the monitoring and detection of interruptions and attendant notice transmissions, at the edge of the network 1, is implemented in optical network terminals (ONTs) 2, which connect to the local fiber distribution plant 3 of the network 1 as the network-side medium. The ONTs 2, located on or adjacent to respective customer premises 4, provide the two-way communication interface between various communications devices with the respective customer premises 4 and the network 1, via loop plant facilities 3.

The network 1 includes a number of video servers that store recorded video programs, and in several cases, record video programming that is being sent to one or more of the customer premises 4. If a program is not already recorded in the network and is not being recorded for another service at the time of an interruption, an interruption notice from the ONT 2 causes a network video recorder (NVR) 8 or 9 to record a program being viewed, from a point substantially corresponding to the point of the interruption. Resumption of service then allows the network to offer to resume the program for the viewer, from the point of interruption, based on a transmission of the recorded program from the appropriate server or NVR. Before discussing the monitoring, messaging, recording and playback functions, it may be helpful to begin with a discussion of the exemplary network and various component elements thereof.

In the example of network 1, the first tier or layer of the network is the multi-subscriber local fiber optic "loop" distribution facilities 3. The network 1 may utilize fiber rings for the local loop plant, however, the example uses a passive optical network (PON). The passive optical network 3 has a tree-and-branch fiber topology and utilizes wavelength division multiplexing (WDM) to carry optical signals to/from a number of customer premises 4 over one or more fibers to/from each premises 4.

The next level in the network hierarchy is the area-wide fiber optic ring 5, which interconnects a number of local loop facilities 3 in a given area. In the example, the rings 5 utilize Gigabit Ethernet, over SONET, on two-way (redundant) optical fiber rings. Alternatively, this layer may use two-way communications over fiber trunks 6, without the ring topology. In the example, the dual super trunks 6 are implemented utilizing previously unused ('dark') fiber plant. The area ring 5 or other fiber link 6 provides communications to and from the next higher layer of the network 1. In a typical carrier network, the top layer of the network hierarchy is a backbone ring 7. In the example, the backbone ring 7 is a dual fiber two-way ring carrying SONET OC 192.

The present discussion focuses on distribution and recording of video communications. Hence, the network 1 and several elements of the network are identified using video network terminology, such as video serving offices (VSO) 11, video hub offices (VHOs) 23 and super headends (SHEs) 31. It should be noted, however, that such terms are descriptive of the video functions of most interest to the examples discussed here, and that appropriate network components will often have additional functions and may be described using different terms when focusing on other services offered through the same or similar network nodes.

The first layer 3 provides local communications, sometimes referred to as local loop transport, between the video serving offices (VSO) 11 and multiple customer premises 4. Optical network terminals (ONTs) 2 are the edge devices at the customer premises 4. In the examples, the ONTs 2 are soft in that they incorporate programmable communications control involved in implementation and delivery of network services, although other optical interface equipment may be used. Typically, in the illustrated network 1, an ONT 2 will provide a standard telephone line interface for voice telephone services as well as one or more interfaces for digital broadband services on the same or preferably separate in-house wiring. The digital broadband services may include a data communication services, e.g. for Internet access. For purposes of the discussion of the video recording service, the ONT also supports one or more digital video services. As discussed more below, the example provides both digital broadcast video services and narrowcast video service.

In the example of network 1, the local distribution network 3 utilizes a wavelength division multiplexing implementation of a passive optical network (PON), whereas the higher levels 5 and 7 utilize redundant SONET ring architectures. Hence, at the VSO 11, an optical line terminal (OLT) 12 provides connectivity between the first layer serving as the distribution network 3 and the next higher network layer, ring 5. The OLT supports two-way digital optical communication for narrowcast video services. The OLT 12 is a passive device that provides optical coupling to the fiber(s) to the customer premises. The OLT functions as a digital cross-connect in the optical domain, e.g. to provide SONET interconnections between the higher level portion of the network and the fiber links to the customer premises. It may also provide some protocol conversions, if necessary. The OLT also provides connectivity for voice telephone service, e.g. offered through a telephone switch 13 connected to the public switched telephone network (PSTN).

Two-way data communications, two-way signaling related to video communications and to narrowcast video communications going between the OLT 12 and the higher layers of the network 1 are combined with other communications to/from the premises, e.g. for telephone and/or Internet access services. In the example, the network utilizes wavelength division multiplexing (WDM) to transport video and other communications on multiple wavelengths on the fiber distribution network 3. Hence, in the example, a WDM coupler 14 multiplexes downstream communications through the OLT 12 on a wavelength assigned to those services together with one or more wavelengths of light for other services and transmits those wavelengths together over the fiber distribution network 3. In the upstream direction, the WDM coupler 14 splits the various wavelengths as necessary, for the different services. The upstream wavelength carrying communications related to voice, data and video service signaling, for example, goes to the OLT 12.

The light wavelengths in the fiber distribution network 3 provide sufficient transport capacity to provide digital services to a number of customer premises 4. An optical splitter hub 20 supplies downstream light carrying communications signals to several customer premises and combines upstream transmissions from the customer premises for optical transport to the OLT 12.

In an example of the PON type local distribution network 3, all upstream traffic (e.g. voice, data, signaling and/or user video) might utilize 210 nm wavelength light as the carrier, at 155 to 622 Mbps. The WDM coupler 14 routes this wavelength from the fiber loop plant 3 to the OLT 12. Downstream voice, data, signaling and narrowcast video, at a combined 622 Mbps, might utilize 1490 nm wavelength light as the carrier. The OLT 12 supplies this second wavelength to the WDM coupler 14 for transmission to one or more customer premises 4.

Broadcast video might utilize 1550 nm wavelength light as the carrier through the local loop plant facilities 3. As noted, the next higher level ring 5 is a SONET ring. Hence, the VSO 11 also includes an add-drop multiplexer (ADM) 21 to provide two way communications to/from the ring and from/to a number of OLTs 12 within the particular VSO 11. In the downstream direction, the ADM outputs the broadcast video signals on 1550 nm wavelength light, and the WDM coupler 14 combines that light with the 1490 nm wavelength light carrying the downstream voice, data and narrowcast video communications for transmission through the fiber loop plant 3 to customer premises 4. In the upstream direction, the ADM 21 adds data and video signaling communications from various customer premises 4 for transport around the ring 5.

The ring 5 provides video distribution from a VHO 23 to a number of VSOs 11, both for broadcast services and for narrowcast services. The ring 5 also provides two-way data transport, for signaling communications related to the various video services and for data communication services. Alternatively, one or more of the VSOs 11 may communicate with the VHO 23 via dual super trunk fibers 6.

In the illustrated example, the ONT 2 includes a line card that provides a standard telephone line interface over twisted wire pair to one or more analog telephones or the like 15, for service sometimes referred to as plain old telephone service (POTS). Another interface card typically provides a local data connection, such as an Ethernet link to personal computers or other data devices 17. Another card provides a separate video link to one or more video decoders referred to as "set-top boxes" 18 connected to television sets 19. Alternatively, the television(s) 19 in a customer premises 4 could use the same digital link as the data devices 17. The TV 19 may be compatible with a digital video protocol on the data link, but typically the subscriber uses the set-top box (STB) decoder 18 to convert the digital video to a signal compatible with the particular type of TV set 19.

The ONT 2 also includes an optical/electrical (O/E) interface to the fiber optic local loop plant 3. An intelligent processing and routing element, between the customer premises media interface(s) and the optical/electrical interface, essentially controls the ONT 2 at the edge of the carrier's network. This functionality essentially provides logical interfaces as well as any necessary two-way protocol conversions between the in-house communication protocols on the wiring or other media in the customer premises and the optical packet transport on the PON type loop plant 3. The logical interfaces provided by the ONT 2 support the appropriate service logic, for the services and service features offered through the network 1. For voice telephone service, for example, the ONT may convert between analog and digital formats, implement any desired voice coding and decoding scheme, packetize and depacketize the encoded voice information, and perform any address processing if necessary. The structure and functionality of examples of the ONT 2 are discussed in more detailed below, with reference to FIGS. 2 and 3.

A power supply unit 16 provides power to the ONT 2. Normally, power is supplied from the regular commercial AC power grid at the customer premises 4. Power supply unit 16, however, also has battery backup for use during outages.

Although only one example is shown for convenience, a number of the ONT type edge devices 2 communicate via the first level optical fiber PON 3 to a Video Serving Office (VSO) 11. Each VSO 11 may serve one or more fiber distribution facilities 3, so as to provide communications to and from numerous customer premises 4, although the simple example shows only one fiber distribution tree 3 to one of the VSOs 11.

In the illustrated architecture, the Video Serving Office (VSO) 11 functions as a first level intelligent router or switch. In the network 1, the VSOs 11 are relatively high-capacity devices providing packet-based routing and switching to implement desired video, voice and data services. For video, each VSO 11 combines video broadcast and narrowcast feeds together with voice and data. A VSO 11 may implement some service logic based on its own internal provisioning, and/or for other services or features the VSO 11 may perform service control in response to instructions from a higher level controller.

Several video serving offices (VSOs) 11 in an area in turn communicate via the next higher level ring 5 or via video super trunks 6, with a video hub office (VHO) 23. Like a VSO 11, the VHO 23 is a relatively high-capacity router and service switch, which provides packet-based routing and switching to implement desired video, voice and data services. In addition to the appropriate interface and router hardware (not separately shown), the VHO 23 includes a central processing unit (CPU) 24 programmed to control VHO operations and to implement service control logic, e.g. related to conditional access (CA) functions and the service interruption responsive program recording/playback. The logic for VHO handling of most of the services may reside in the VHO 23 as stored programming for the CPU 24, or for some services, the VHO 23 may perform control in response to instructions from a higher level controller (not shown).

Several VHOs 23 communicate with each other and with video super headends (SHEs) 31 via the third level optical fiber ring 7. Each of the VHOs 23 will typically communicate through two or more of the intermediate level rings 5 or fiber super trunks 6 with video serving offices 11, and thus to equipment at a large number of customer locations 4 within the overall service area. Of course, the geographic area encompassed by the network 1 may include any desired physical area serviced by the particular carrier, depending on its business structure and the like.

Legacy switches, such as the telephone office switch 13, may connect into a VHO 23, but typically connect to a VSO 11, as discussed above. The switch/router hardware within the VHO 23 is designed for a higher traffic capacity, to support the communications around the backbone ring 7.

Each SHE 31 also functions as an intelligent router or packet switch. The SHE 31, however interfaces only to the backbone SONET ring 7. In addition to the appropriate interface and router hardware (not separately shown), the SHE 31 includes a CPU 32 programmed to control SHE operations and to implement service control logic, e.g. related to conditional access (CA) functions and possibly to service interruption responsive program recording/playback. The logic for SHE handling of most of the services may reside in the SHE 31 as stored programming for the CPU 32, although it would be possible to set-up the SHE 31 to perform control in response to instructions from a separate controller.

A Super Headend (SHE) 31 acquires content to form a national channel lineup for broadcast video service. For example, the SHE 31 may acquire/obtain content such as national programs (e.g. ESPN, Lifetime, MTV, Weather channel) and acquire/obtain material for national advertisement insertion. In the example, the SHEs 31 acquire content via satellite feeds 41, although other sources of video feeds may be used. Another function of the SHE is to consolidate/ groom such content into the national channel lineup and distribute that content to the VHOs 23 via the backbone ring 7. The SHE also provides a conditional access system (CAS), for which it maintains a master customer database and by which it creates and distributes encryption keys.

The VHOs 23 also acquire content from local sources represented by the off-the-air antennae 43, and consolidate/ groom that content to form a local channel lineup. The local feed includes over-the-air digital programming. Any analog over-the-air programs can be converted to digital data at the VHO. Where the carrier can contract appropriately with local broadcast providers, the local feeds may utilize direct digital inputs for some or all of the local broadcast content. Examples of the content obtained at the VHO level include local broadcast channels (both independents and network affiliates e.g. of ABC, NBC, CBS, etc) and public, education and government (PEG) programming. The VHO 23 also may receive materials and perform local advertisement insertion in video streams received over the backbone network 7. The VHO may develop and distribute an Interactive Program Guide (IPG) and/or Emergency Alert System information.

The VHO 23 also receives the national lineup from the SHE 31, and the VHO consolidates/grooms local and national content into a broadcast video feed. Hence, the SHE 31 broadcasts the national channel lineup around the backbone ring to all of the VHOs 23; and the VHOs 23 add the local lineup, e.g. off-the-air programming from antennae 43. The network 1 may provide video services from the VHOs 23 to the customer premises 4 on an interactive basis, with the program switching done at the VHO or VSO level and transport provided via dedicated virtual channels to the set-top boxes 18 in the customer premises 4. In the exemplary network 1, however, the national channel lineup with the added local content lineup is broadcast through the VSOs 11 and the local distribution plant 3 to the customer premises 4. Specifically, in the VSO 11, the ADM 21 supplies broadcast video content received via the ring 5 to one input of the WDM coupler 14. The ADM 21 also provides a two-way communication link between the ring 5 and the OLT 12, both for data communications and for narrowcast video communications. The OLT 12 also is the point of interconnection for voice traffic, e.g. for connection to/from a telephone office switch. In the downstream direction, the OLT 12 combines voice traffic with the data and narrowcast video traffic, for transport on one of the wavelengths used in the local fiber distribution plant 3. In the upstream direction, the OLT 12 segregates such traffic and supplies the communications regarding data and narrowcast video services to the ADM, whereas voice communications go to the telephone switch 13.

The VHO may also offer connectivity for video storage and related narrowcast video services. Hence, in the example, each VHO has or connects to a video server 34. A typical service provided by such a server would be video on demand (VOD), which utilizes narrowcast video connectivity from the VHO to STB 18 in the customer premises 4 to transmit requested video content for presentation to the viewer via TV 19.

The VHO also implements a Conditional Access System (CAS) and distributes authorization and encryption to set top boxes 18. Conditional access (CA) is a function that allows content providers to prevent theft of service and to restrict certain programming products to certain viewers. The CASs at the SHE 31 and at the VHO 23 implement conditional access by encrypting the content provider's programs. Consequently, the programs must be decrypted at the receiving end before they can be decoded for viewing. CA allows for restricting access to bundles of channels as well as by service, such as: pay-per-view (PPV), video-on-demand (VOD), games and premium channels.

The set-top box 18 is responsible for descrambling the CA encryption and decoding the MPEG-2 data for viewing. Periodically (e.g. monthly), the set-top box 18 receives an entitlement management message (EMM) from the CAS in the SHE 3, which allows the set-top box 18 to access services. The EMM may be uniquely addressed to the particular set-top box 18, or the EMM may be distributed to set-top boxes 18 in a particular geographic region or service area. The EMM contains the encrypted service key. Typically, this key is changed as required to discourage hackers. As the user selects different programs to view, the set-top box 18 communicates with the CAS functionality implemented in the serving VHO 23 to obtain an entitlement control message (ECM), which represents specific permission to view a particular selected program. The VHO 23 sends the ECM once every few seconds, to keep permission current.

Of note for purposes of this discussion, the conditional access communications inform the VHO 23 in substantially real-time as to the broadcast program a user may be viewing, on each active set-top box 18. The CPU 24 in the VHO 23 knows which set-top boxes are active at each premises. Since the servers 34 reside in or are coupled to the VHOs 23, in the example, the VHO 23 serving a particular premises 4 is also aware of any viewer's narrowcast programming choices, e.g. for a video on demand service from server 34.

When one premises 4 is out of service, typically, a number of premises 4 in a geographic region or territory are also suffering an interruption. The network elements, such as the SHEs 31, VHOs 23 and VSOs 11 will have back-up power supplies and will typically not suffer from the same interruptions as the customer equipment within the premises 4. The ONT 2 normally draws power from the customer premises, but the supply 16 for the ONT also has a battery back-up. For example, a power outage at premises 4 will interrupt the user's ability to view programming through the set-top box 18 and the television 19, but it will not immediately impact communications from the ONT 2 through the network 1, and generally will not effect the other network elements, particularly those at the higher levels, such as the VHOs 23 and the SHEs 31.

The network 1 offers both broadcast video services and narrowcast video services. Servers for narrowcast services, such as video on demand, may reside at any convenient point(s) in the network. In the example, the video servers 34 reside at one or more of the VHOs 23. These servers may provide a replay following a service interruption, as discussed in more detail later. The interruption responsive replay service also may utilize one or more network recorders (NVRs), which record broadcast programming. Depending on the implementation of the network 1, the network video recorders could be provided at the VSOs 11, at one or more of the VHOs 23 or at one or more of the SHEs 31.

Network video recorders 9, implemented at or coupled to an SHE 31, would allow storage of at least programming included in the national channel lineup developed at the SHE 31. To capture local programming at an NVR 9, an appropriate VHO 23 would route the programming around the ring 7 to the SHE 31 and the NVR 9.

Location of the NVR 8 for the interruption/recovery service at or in association with the VHO 23 facilitates capture of broadcast programs from the local channel lineup. However, the NVR 8 can also record programs from the national channel lineup, as received through the ring 7 and the VHO 23.

The NVR is essentially a server with associated digital storage sufficient for the intended recording/playback services that the NVR will support. Consider the NVR 8 as an example.

In the illustrated example, the server 35 is intended to represent a general class of data processing device commonly used to run "server" programming. Such devices typically utilize general purpose computer hardware to perform respective server processing functions and to perform the attendant communications via the network 1. Each such server, for example includes a data communication interface for packet data communication. The server 35 also includes a central processing unit (CPU), in the form of one or more processors, for executing program instructions. The server platform also includes program storage and data storage for various data files to be processed and/or communicated by the server. For the NVR application, the server 35 includes or connects to one or more appropriate drives for providing the data recorder (record and playback) functionality shown at 37.

The hardware elements, operating systems and programming languages of such servers are conventional in nature, and it is presumed that those skilled in the art are adequately familiar therewith. The server 9 typically is implemented in a similar fashion, and the video servers 34 may utilize similar hardware although scaled for handling of different amounts of program storage and programmed to implement somewhat different service functions.

The network could offer a VOD-like service for broadcast programs. For such a service, one or more of the servers/recorders (e.g. 8, 9 or 34) would record all broadcast services, both national and local. The service would allow users to request replay of broadcast programs from a few days or a week earlier, essentially on demand. The network 1 would transport requested video to the user's set-top box 18 as a narrowcast video communication. As discussed more, later, interruption-responsive replay of a recorded program would require a notation of the time, program and customer ID at the time of interruption, to offer a replay from that point when service resumes. If not all programs are recorded, as in the example, the system would record programs being viewed from the time of the interruption. Of course, the NVRs could be used for other services, e.g. to provide a network based recording service similar to that provided in the home by TiVo or the like.

As noted above, the ONT 2 monitors one or more conditions relating to operations/communications at the customer premises 4, for detection of an event or condition indicating an interruption in video service to one or more of the set-top boxes 18 at the respective location. Upon detecting a service interruption, e.g. in response to a power outage at premises 4, the ONT 2 signals the VHO 23 providing service to that location. The notice message allows the VHO 23 and server equipment, such as a server 34 or an NVR 8 or 9, to provide a replay form the point of interruption when service resumes. When the interruption report reaches the VHO, if the viewer has been viewing a program from a recording in the server, e.g. as video on demand, the VHO simply informs the appropriate server 34. In response, the server 34 stops sending video for the effected premises 4 and notes the point of interruption with respect to the video program for use as a new starting point upon resumption of service. If the viewer was watching a broadcast program, however, the VHO 23 notifies the NVR 8 or 9. If the program is not already being recorded, the NVR begins recording the program in response to the notice.

In view of the role of the ONT 2 in this service for replay from point of interruption, it may be helpful to consider the structure and operation of exemplary ONTs in somewhat more detail. A number of embodiments of the ONT 2 may be used in the network 1. Although referred to here as an optical network terminal (ONT), the interfacing and monitoring/notice functions may be implemented in similar devices sometimes referred to as intelligent Network Interface Devices (NIDs) or Soft Network Interface Devices (SNIDs). To appreciate the advantages thereof it may be helpful at this point to consider first a functional example and a specific example of an ONT.

Figure 2:
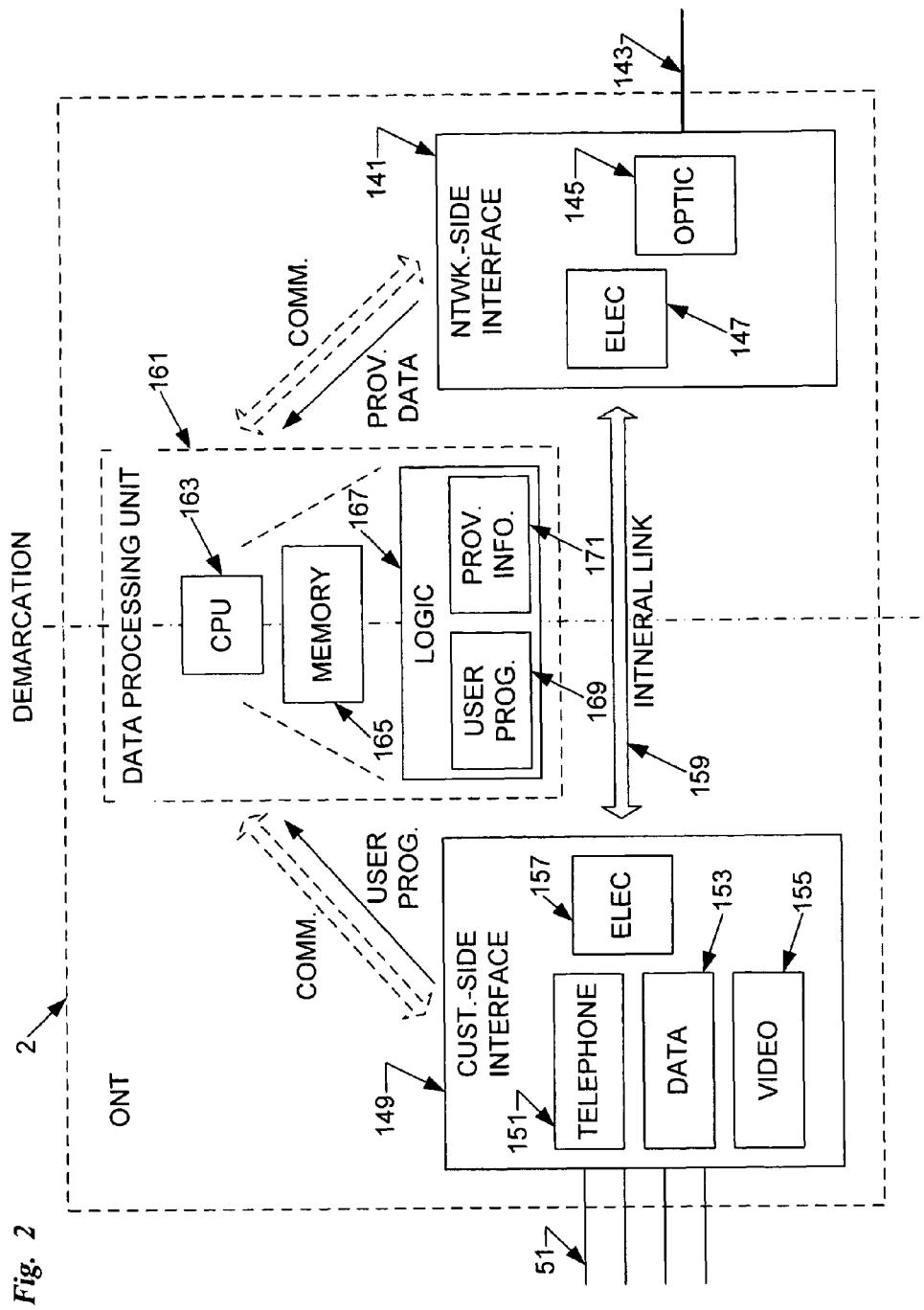
FIG. 2 is a simplified block diagram of the functional/logical elements of an Optical Network Terminal (ONT).
Figure 3:
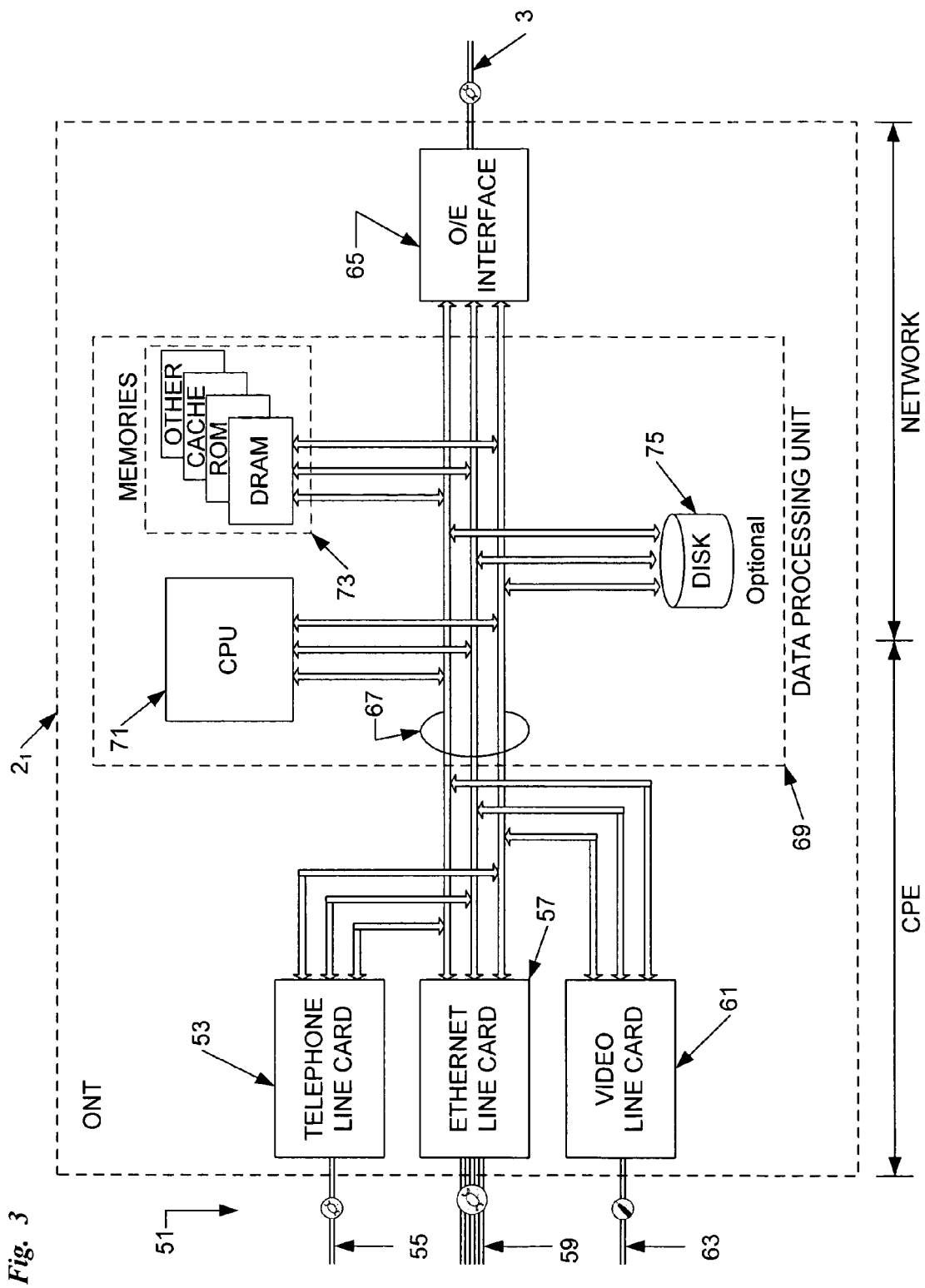
FIG. 3 is a functional block diagram of an example of an ONT, for use in the network of FIG. 1.

FIG. 2 is a simplified functional diagram illustrating the major logical components of a soft network interface device or "soft NID," which may serve as the ONT 2. FIG. 3, in turn, shows an example of how such a logical architecture might be implemented in hardware. Those skilled in the art will understand that the implementations shown in FIGS. 2 and 3 are examples only, and that other ONT implementations may be used, e.g. in different networks and/or to implement the power monitoring and notice transmissions for video recording/replay control in a somewhat different fashion.

The exemplary ONT 2 of FIG. 2 provides a communications interface across a line of demarcation (vertical dot-dash line) between at least one customer premises medium 51 and a public digital broadband communication network (e.g. network 1 shown in FIG. 1). The ONT 2 includes a broadband network-side interface 141. This network-side interface 141 is in communications connection with a broadband medium at an edge of the public digital broadband communication network 1. The media may be any appropriate form of subscriber communications link of the broadband communication network, such as broadband wireless, coaxial cable (of a hybrid fiber-coax network), broadband digital subscriber line, etc. Preferably, the subscriber communications link of the network comprises one or more optical fibers 143 of a fiber to the home or building type network 1 such as PON type loop plant 3.

The broadband network-side interface 141 provides two-way conversions between signals transported on the medium 143 of the broadband communication network 1 and signals in an internal protocol. For an optical network application, for example, the network-side interface 141 includes an optical transceiver 145 for connection to the fiber type medium 143 so as to send and receive optical signals in the appropriate network protocol formats via the link 143. The network-side interface 141 also includes an electrical transceiver 147 for electrical communication of signals within the ONT 2. The components of the network-side interface 141 provide the two-way conversions between the network signal protocols and those used within the ONT 2.

The ONT 2 also includes a customer-side interface 149 for communications connection to the customer premises medium 51. The customer-side interface 149 provides two-way conversions between signals transported on the customer premises medium 51 and signals in the internal protocol. There may be only one medium in the customer premises, for example, for broadband data communications or for telephone communications or a combination thereof. In many premises, the medium 51 will comprise two or more media, for example, different media for telephone services, for video services and possibly for other services, such as data (e.g. Internet access). Hence, the exemplary interface 149 shown in FIG. 2 includes interface electronics 151 for telephone-type communication over a telephone medium and interface electronics 153 for digital video communication. The interface 149 may include other interface electronics 155, for communications of other types of signals over the same or separate media.

Each of the interfaces electronics 151, 153, 155 connects to an appropriate medium within the premises and communicates signals to and from compatible customer premises equipment on that medium, in the appropriate signal formats, e.g. as analog telephone signals, as local area network data signals, as video signals, and the like. The customer-side interface 149 also includes an electrical transceiver 157 for electrical communication of signals within the ONT 2. The components of the customer-side interface 141 provide the two-way conversions between the signal protocols used on the customer media 51 and those used within the ONT 2.

The ONT 2 further comprises an internal link 159 between the broadband network-side interface 141 and the customer-side interface 149. The link 159 carries the signals in the internal protocol, between the interfaces 141, 149.

The ONT 2 may be implemented as a "soft" interface device that is programmable, in that it is possible to install certain programming, control data or other information to modify or adapt the communications functionality of the ONT 2 to the needs or desires of one or more interested parties. To implement this soft functionality, the ONT 2 includes a programmable data processing system 161. The system 161 communicates with the interfaces 141, 149, as shown by the dashed two-way arrows in the drawing, for controlling at least some communications operations through the interfaces. These communications between the interfaces 141, 149 and the data processing system 161 may use any appropriate internal link. For example, embodiments discussed in detail later use a bus structure between the interfaces, and the data processing system(s) connect to and communicate via the same bus structure.

The ONT 2 is programmable, and the intent of the examples is to allow the user and parties on the network (typically a carrier) to program different aspects of the ONT functionality. Hence, the communications between the network-side interface 141 and the data processing unit 161 will include some downloads of network service provisioning data (as shown by the arrow) coming in from the network link 143. In a similar manner, the communications between the customer-side interface 149 and the data processing unit 161 will include some user programming information (as shown by the arrow) coming in from one of the customer premises media 51.

Typically, a data processing system 161 will include at least one central processing unit (CPU) 163 and at least one memory 165. U.S. Pat. No. 6,898,276, which is incorporated herein by reference, discloses examples of soft network interfaces devices that may serve as the ONT. As discussed in greater detail in that patent, the data processing system 161 may be implemented as a single unified system or as two systems in separate customer and network-side modules. An example using a unified system is discussed later (FIG. 3). In either case, the programming for the CPU 163 provided by the memory 165 implements a control logic 167. The control logic 167 of the ONT 2 may include some unified logic bridging the demarcation line, but a substantial part of the logic may be considered as divided into two separate pieces, as shown. One part 169 of the logic relates to user programmable applications, and the other part 171 relates to services and/or service features offered by the carrier that provides the communications services via the public digital broadband communication network.

The data processing system 161 is capable of receiving network service provisioning data, from the public digital broadband communication network via the broadband network-side interface 141 and the link 143. The service provisioning data, here, may be any appropriate form of executable code, service defining/controlling data or other information relating to the ONT's control of the communication services that the ONT and the network provide to the particular customer premises. The received provisioning data defines the states and control functions in the service provisioning logic 171 and is stored in the memory 165 in association with the programming for logic 171. As programmed, this logic 171 in the data processing system 161 controls one or more operations of the ONT 2 as it relates to one or more services that the customer premises obtains from the public digital broadband communication network.

For the video recovery service, the network side programming causes the ONT 2 to monitor one or more conditions, e.g. power, impacting video service in the premises 4. Responsive to changes in state of the monitored condition, the programming also causes the data processing unit 161 of the ONT 2 to send notice messages. Provisioning data received from the network side sets up the functions with regard to the video recovery service, e.g. to enable the data processing unit 161 to address the notice messages to the appropriate VHO 23 (or other network element).

In the exemplary ONT, the data processing system 161 also is capable of receiving user programming, from the customer premises, via the customer-side interface. This capability at least allows the customer or other user at the premises to input some optional parameters, such as a primary interexchange carrier (PIC) code for a preferred long distance carrier, speed dial lists, interne service provider (ISP) identifiers, and the like. The user programming logic includes one or more application programs, and some embodiments allow the user to input new or upgraded application logic to modify or supplement the logic 169. The executable code and/or data received as the user programming defines the states and control functions for the user programmable applications logic 169. Received inputs from the user are stored in the memory 165 in association with or as part of the programming for logic 169. As programmed, this applications logic 169 in the data processing system 161 controls at least one operation of the ONT 2 in accord with the received user programming.

FIG. 3 shows the elements of an exemplary embodiment of a soft network interface device type implementation of an ONT $2_1$, in block diagram form. This particular implementation is one intended to support a combination of different telephone, video and data services available via the network 1. As discussed more below, the example is one appropriate for a residence or small/home business customer, although those skilled in the art will recognize how to scale the concept to service larger volume customers.

The exemplary ONT $2_1$ at each customer premises 4 terminates the customer premises wiring and provides the interface to the first level fiber 3. Each ONT $2_1$ includes one or more interface cards, supporting two-way communication connections to the media 51 utilized in the particular home or business premises.

In a multi-service embodiment such as that of FIG. 3, the ONT $2_1$ provides a standard telephone line interface for voice telephone services as well as one or more interfaces for data and video services on the same or preferably separate in-house wiring. Hence, the illustrated ONT 21 includes a telephone line card 53 that provides a standard telephone line interface over twisted wire pair 55, to one or more telephones 15 as shown in the earlier drawing. The ONT $2_1$ also includes a data interface card, which in the example is an Ethernet line card 57, for providing two-way Ethernet local area network (LAN) type communications, e.g. over CAT-S cable 59 (shown as multiple twisted pairs) although data communications could use wireless network technologies. The ONT $2_1$, may include other types of line cards, and in this example, the ONT includes a line card 61 for providing video services over an in-home coaxial cable 63. The customer may have any number of different types and combinations of wired or wireless telephone and broadband communications media within the customer premises, and the customer would select the appropriate set of line cards to interface to those media 51 for the desired service applications.

The ONT $2_1$, also includes an optical/electrical (O/E) interface 65 to the first level fiber 3. The interface 65 conforms to the physical layer protocols required by the neighborhood optical fiber 3. For example, this interface 65 would include another WDM coupler and optical/electrical conversion elements for sending and receiving digital information via the wavelengths used in the PON type loop plant 3. An internal bus network 67 interconnects the customer premises-side interface cards 53, 57 and 61 and the O/E interface 65, and the bus 67 connects all of those interfaces to elements of an internal data processing system 69. On the internal side, the O/E interface 65 conforms to the electrical signaling protocols utilized on the bus network 67 and by the other elements of the ONT $2_1$.

The network 1 provides fast packet transport for all communications through the network, for example, including the voice telephone service and all broadband services, including video distribution services. Related packet processing functions may be performed in the O/E interface 65 or in the line cards.

As noted, the illustrated ONT $2_1$, includes a telephone line card 53 that provides a standard telephone line interface over twisted wire pair 55, to one or more telephones as shown in the earlier drawing. The line card may provide ISDN type digital service. The media for the telephones could utilize wireless links, power lines, or other in-home media. However, for many customers, the line card 53 provides analog-type plain old telephone service over the twisted pair wiring 53 to existing standard telephone equipment, as illustrated in the drawings.

For an analog type plain old telephone service (POTS), the line card 53 provides two-way conversion between analog and digital signals. The POTS line card 53 also provides normal telephone line functions, such as battery feed, over-voltage protection, ringing, signaling, coding, hybrid and testing (commonly collectively identified as the 'BORSCHT' functions, in the telephone industry).

The hybrid functionality of the telephone line card 53 performs a two wire to four wire type conversion. The line card 53 sends and receives analog signals over a twisted wire pair 55, and the telephone line card 53 sends and receives digital signals through the bus 67 and the network rings. More specifically, in the upstream direction, the telephone line card 53 receives analog signals from the associated twisted wire pair 55. The line card 53 converts those signals into digital signals in a format compatible with the bus network 67 and the fast packet communications utilized by the network 1. The telephone line card 53 supplies the digitized audio information signals through the bus 67 to the O/E interface 65, for upstream transmission through the fiber loop 3 to the VSO 11 serving the particular PON distribution plant 3. In the downstream direction, the O/E interface 65 supplies voice telephone information received from the fiber loop 3 over the bus network 67 to the telephone line card 53. The line card 53 in turn converts the downstream digitized information signals to analog form and couples the resultant analog signals to the twisted wire pair for two-wire transport to the customer premise equipment.

An ISDN implementation of the line card 53 would perform functions similar to those described above for the analog version of the telephone line card 53, except that the signals provided on the relevant customer wiring 55 would conform to ISDN standards. In the example, the telephone line card 53 provided a single telephone interface to one customer premises line 55. This may be typical for residential installations. However, high-end residential users and businesses will require increasing numbers of telephone lines. It is envisaged that different versions of a telephone line card 53 may support 1, 2, 14, 12, 24 or 32 customer premises telephone lines in either POTS analog form or digital ISDN form. For commercial applications requiring still more lines, the ONT $2_1$, would include multiple telephone line cards 53 to provide an aggregate telephone line capacity to meet the needs of the particular business customer.

In the example, a second interface card provides a local data connection. The subscriber may choose any conveniently available data interface, such as Home Phoneline Networking Association (HomePNA), IEEE 802.11 wireless LAN, or other home networking protocols and media. In the illustrated embodiment, the data interface is an Ethernet line card 57 for data communication, e.g. over CAT-5 wiring 59. For a typical residential application, the Ethernet card 57 would provide 10baseT data communication within the customer premises. However, other users, particularly business users, may opt for 100baseT or even gigabit Ethernet type local area network operations. The line card 57, the bus 67 and the O/E interface 65 essentially provide two-way interworking between the data protocols on the customer premises wiring 59 and the neighborhood fiber loop 3. To the in-home network, the ONT 2, appears as another device on the LAN, albeit providing access to the broader area services available via the network 1.

As noted above, the ONT $2_1$, includes one or more line cards 61, to support video communications within the premises 4 and provide interfacing thereof to the network 1 via local fiber plant 3. In the illustrated implementation of the ONT, broadband line cards for data and/or video are selectable at the option of the owner of the particular customer premises. Examples include X10, which is a communications protocol for remote control of electrical devices and communications over standard household AC power-line wiring, and IEEE 294, which is a serial interface for short-range, low-data-rate, infrared communications between entertainment and computer devices. In the example shown, the ONT $2_1$, includes a video line card 61 for digital video communications with the set top boxes 18 over coaxial wiring 63.

The ONT $2_1$, is an intelligent processing and routing device, essentially implementing logical functions as discussed above relative to FIG. 2. To implement the control logic for these functions, the ONT $2_1$ includes a data processing system 69 coupled to the bus 67. The exemplary data processing system 69 comprises elements of a general purpose computer programmed to control the interfaces and communications over the bus 67.

In the example, the data processing system 69 contains a central processing unit (CPU) 71 and memories 73 connected to the bus 67. The CPU 71 may contain a single microprocessor, or may contain a plurality of microprocessors for configuring the data processing system 69 as a multi-processor system. The memories 73 serve as the main memory and program storage for the CPU 71. The memories 73 typically include dynamic random access memory (DRAM), a read only memory (ROM) and high-speed cache memory. The memories 73 may include other types of devices, such as an electrically erasable programmable read only memory (EEPROM), flash memory and the like. Optionally, the data processing system may include a hard disk drive 75 or other mass storage device, such as a CD or DVD drive, a floppy disk drive, tape drive, etc.

In operation, the main memories 73 and/or the hard disk 75 store at least portions of instructions and data for execution by the CPU 71 as well as associated working data. The instructions and data include various address tables and other routing data needed to interwork the in-home communications to the transport protocols utilized in the network 1 as well as some service provisioning data. As noted in the discussion of FIG. 2, the programming also includes a program to implement the recovery service related functions, including the monitoring, interruption detection and notice transmissions. The stored information may also include instructions and data relating to applications and services controlled by the user. Overall, the executable program code and associated control data implement the logic 167, 169 and 171, discussed above relative to FIG. 2.

The data processing system 69 is programmable in response to digital communications received via the fiber loop plant 3, for example from a database or from a terminal such as a maintenance operations console (MOC). Typically, one (or more) of these carrier systems downloads service provisioning data to the ONT $2_1$, and possibly some application programming, to enable the ONT to provide specific network services and related features, which the customer purchases from the carrier. Such data also may be downloaded from other carriers or service providers, such as a long distance carrier or an ISP. The data processing system 69 also is programmable in response to communications received via the customer premises media 51 and the bus 67, for example from a telephone 15 and/or a computer 17 in the customer premises 4 (see FIG. 1). Initial and/or diagnostic programming may be performed via a local port or removable storage media drive (not shown), such as a drive for a floppy disk, a compact disc read only memory (CD-ROM) drive, or an integrated circuit non-volatile memory adapter (i.e. PC-MCIA adapter).

As noted, the ONT 2, essentially is the edge of the carrier's network 1. The device connects to the network 1 via the PON type fiber loop plant 3 and provides the interfaces to the media 51 within the customer premises. Some functions of the ONT 2, are programmable by the carrier, typically via data communications carried through the network and some of the service control logic of that gateway function is responsive to instructions from other nodes of the network 1. Also, some functions of the ONT 2, are programmable by the user. Hence, the line of demarcation between the network 1 and customer premises may be viewed as bisecting the ONT $2_1$. Logically, the ONT 2, may be thought of as partially a customer's device, that is to say as customer premises equipment (CPE), and partially a network device. Stated another way, the customer-side interfaces 53, 57 and 63 and a portion of the logic implemented by the data processing unit 69 are part of the customer premises equipment. However, the O/E interface 65 and a portion of the logic implemented by the data processing unit 69 are part of the loop plant 3 on the carrier's network 1.

An alternative hardware implementation of the ONT might use separate network side and CPE side hardware, including separate processing unit hardware. Additional examples of such devices may be found in U.S. Pat. No. 6,898,276.

As shown in FIG. 1, the ONT 2 draws power from the supply 16 in the customer premises. Under normal operation, the supply 16 utilizes AC power from the public power grid. However, to insure that network communications may continue in the event of a power outage, particularly for telephone services, the supply also incorporates a battery back-up and a control for switching over to the battery backup in the event of an AC power outage. A variety of different power supplies providing battery back-up are known in the telecom industry.

The data processing unit 69 (FIG. 3) within the ONT $2_1$ can detect the switchover of power supply 16 to the back-up battery. For the interruption responsive replay services, the ONT $2_1$ could monitor other conditions to detect an interruption in the video service. The example, however, utilizes the detection of switchover to the battery backup power supply as an indication of interruption of power within the premises 4. The set-top boxes 18 within the premises normally draw AC power from the public power grid the same as does the supply 16. Hence, interruption of AC power to or within the premises interrupts video services provided through the set-top boxes 18; and the switchover to battery backup informs the ONT $2_1$ of that interruption.

Upon detection of the power outage, the data processing unit 69 causes the ONT $2_1$ to send an upstream signaling message, as packet data message addressed to an appropriate network node. In the example, the message is addressed to the VHO 23 serving the particular customer premises 4, but it could be addressed to another VHO or to one of the SHEs 31 or to specific server equipment. The message essentially provides a notice of the interruption detected at the customer premises.

The interruption notice message includes an identifier. The identifier will at least identify the customer premises, for example, by identifying the particular ONT $2_1$. The identification data in the notice message could also (or alternatively) identify each set-top box 18 that was active just before the interruption.

In the example, the interruption notice message includes a time stamp, signifying the time/point of interruption. Where the network 1 is aware of the programming being viewed via each set-top box 18 and associated television 19, the identification data together with the time stamp may be sufficient for the video recovery service. In some networks, however, it may be helpful for the ONT $2_1$ to also include a program identifier in the notice message, to facilitate start-up of the recording operations and/or replay with respect to each active set-top box 18.

The interruption message goes to the network node that controls the interruption-responsive replay service, e.g. the VHO 23 in our example. If the program was a video on demand (VOD) program, the VHO 23 forwards the notice to the server 34 providing the VOD program during the current session. Some network service providers may offer a service in which one or more of the NVRs record all broadcast programs, for time-shifted replay. In such a situation, if the customer was viewing a broadcast program, the VHO forwards the notice to the server of the appropriate NVR 8 or 9. In either of these two cases, the ONT $2_1$ provides a follow-up notice to the VHO upon resumption of service and the appropriate server can provide the replay (of a VOD program or of a recorded broadcast program) from the point of interruption, that is to say from the time of the program corresponding to the time stamp in the interruption notice message. A message may be provided to the customer asking if they want to resume viewing the program. If the customer opts to resume viewing, the set-top 18 sends an acceptance message to the relevant server. In response, the server, VHO and VSO therefore set-up a narrowcast video communication to the set-top box 18, and the server sends the program to the set-top box 18 for decoding and presentation to the viewer via the TV 19.

Figure 4:
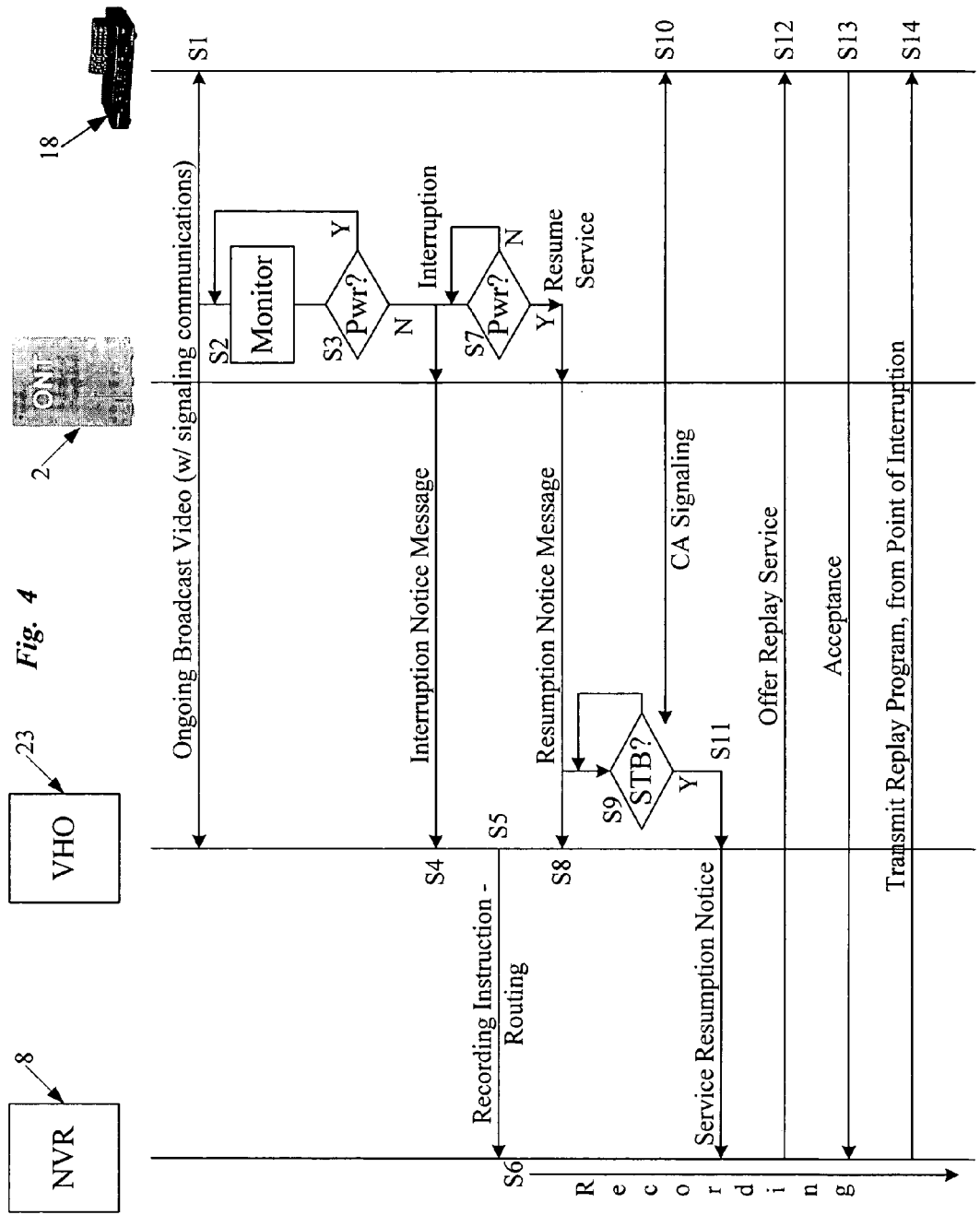
FIG. 4 is a simplified signal/logical flow-chart, useful in explaining the exchange of signals and attendant processing steps in an example of a replay service provided for recovery from interruption of video service due to a power outage.

Assume now for purposes of a more detailed discussion of a service example, that the viewer was not engaged in a VOD session at the time of interruption, and that the service provider is not recording the entire program at the time of the interruption for some other service. Hence, a video recovery-replay service will be offered that entails beginning the recording of the program in response to the detection of the service interruption. FIG. 4 is a simplified diagram, useful in explaining the exchange of signals and attendant processing steps in such an example of a recovery service provided for recovery from interruption of viewing of a broadcast video program, due to a power outage. Hence, in the example, assume that the set-top box 18 is engaged in receiving and decoding broadcast video signals from the VHO 23 (and other network elements) and is conducting ongoing signaling with regard to those communications (e.g. for CA purposes), as represented by the two-way communications at step S1 in the drawing.

As noted above, the data processing unit 69 (FIG. 3) within the ONT 2 monitors status of power supplied in the premises to the video equipment including set-top box 18, as represented at S2. The data processing unit 69 in the ONT 2 checks the status of the power at step S3, and if power is supplied in the normal manner, the processing within the ONT continues monitoring at S2. The monitoring and analysis of power status continues in a loop until the data processing unit 69 (FIG. 3) within the ONT 2 detects the switchover of power supply 16 to the back-up battery as a service interruption, at which point, the process flows from S3 to S4.

Detection of service interruption at S3 causes the ONT 2 to send an upstream signaling data message through the network 1 to the VHO 23, notifying the VHO of the interruption (step S4). The CPU 24 controls operations of the VHO 23, including operations responsive to such a interrupt message.

The ONT may monitor the program being viewed through each active video device within the premises 4. In such an implementation, the ONT would transmit a program identification for the network video recorder upon detection of the interruption. However, in the example, the network is aware of the program being viewed, e.g. from conditional access (CA) signaling as the user selects each program for viewing. Hence, the VHO 23 only needs to know that there has been an interruption and the identification associated with the customer (ONT ID, customer ID or set-top ID). Based on the identification, the CPU 24 reviews appropriate conditional access control information to determine the most recent program being viewed by the customer through the set-top box 18 (or by viewers through multiple set-top boxes at the particular premises). For ease of further discussion, we will assume that one set-top box viewing one program was affected by the interruption. Based on the program identification, the VHO 23 routes the identified program for the one set-top box 18 to the NVR 8 and instructs the server 35 to initiate recording of the program to storage implemented in the data recorder 37, as shown at step S5 in FIG. 4.

The time stamp included in the notice message from the ONT 2 substantially corresponds to the time of interruption of power and video service at the customer premises 4, although there may be some time lag between actual interruption of viewing and detection by the ONT 2. Communications through the network 1 to initiate recording of the appropriate program in the NVR 8 also will take some small amount of time. Hence, in the example, the recording at the NVR 8 (step S6) will begin at the approximate point in the program at which the viewer was viewing the program when he or she lost video service, that is to say, allowing for some small time delay and resulting discrepancy between the point of the program last viewed before the interruption (branch N from S3) and the point of the program initially recorded (start of S6). The CPU of the server 35 may compare the time stamp to the current time or program time and decline to initiate recording if the difference is too large, e.g. if there seems to have been some undue delay in processing between interruption detection and an attempt to start recording the interrupted program.

Assume for discussion purposes, that the NVR 8 begins recording the interrupted program in response to the notice responsive instruction from the VHO 23, as shown at S6. The NVR 8 records the program until it reaches some limit set by the service provider or at least until the user's set-top box 18 comes back on line and notice thereof is sent to the NVR 8.

At the customer premises side, the ONT 2 continues to check power status (S7), until it detects a return of regular AC power (shift back from battery backup). In response to detection of power, the ONT processing branches from step S7 to step S8, on the assumption that video service has or can be resumed. At step S8, the ONT 2 sends another notice message upstream through the network 2 to the VHO 23, notifying the VHO of the possible resumption of service. This message includes the same identification data as the earlier message, but this message specifies resumption of service. In response, the CPU 24 of the VHO 23 checks to determine if the set-top box (STB) 18 is back on-line, at S9. When the set-top box S10 is back on-line, communications with the VHO 23 resume, for example, in the form of CA-related signaling as shown at step S10. In our example, the VHO detects resumption of communications by the STB 18, processing flows from S9 to S11, at which point the CPU 24 in the VHO 23 notifies the server 35 in the NVR 8.

If the viewer comes back on line before the recording reaches the set limit, the server 35 sends a data message (and possibly an image or short video) through the network 1 specifically addressed to the reactivated set-top box 18, offering to replay the program recorded from the point of interruption (step S12). The set-top box 18 decodes the message from the server 35 and presents it to the viewer via TV 19. This message informs the viewer of the replay option and prompts the viewer to select whether or not to resume viewing from the point of interruption.

Typically, the viewer will operate the set-top box 18 or its remote control to input a selection, in this case, indicating acceptance of the replay offer. In response, the set-top box 18 sends an acceptance message through the network 1 to the server 35 (S13). If the message indicates that viewer chose to view the program from the start of the recording (approximately corresponding to the point of interruption), then the NVR 8, the VHO 23 and VSO 11 set-up a narrowcast video communication to the set-top box 18, and the server 35 sends the program from storage 27 to the set-top box 18 for decoding and presentation to the viewer via the TV 19 (S14). This replay starts from the start of the recording made at the NVR 8, that is to say from the point in the program substantially corresponding to the point of interruption. The NVR 8 will continue to record the ongoing program (S6) while it is playing back the previously recorded portion of the program, so that the user can view the program continuously from then on without further interruption, until the end of the program.

For example, if the customer is having a party to watch the Super Bowl, and the power goes out for 8-10 minutes, when the power comes back on, the customer can resume viewing the Super Bowl from the approximate point of interruption and continue viewing until the Super Bowl and follow-up programming is over. In this way, the network recording service provided by the ONT 2 and the NVR 8 provides a continuous time shift of 8-10 minutes to compensate for or otherwise recover from the video service interruption due to loss of power.

The process flow for implementing recovery services with replay from about the point of interruption may vary from the representative flow shown in FIG. 4. Those skilled in the art will understand that the processing starting at S11 could be responsive to just one of the messages, e.g. without the need for both a power resumption message and detection of a CA signaling message. In the example, service resumed to the same set-top box 18 as was in-use prior to the interruptions. There may be some situations where there are multiple video devices in the premises 4 and the notice (and recovery replay) go to a different one of those devices.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

Add-Drop Multiplexer (ADM)
Battery feed, Over-voltage protection, Ringing, Signaling, Coding, Hybrid and Testing (BORSCHT)
Central Processing Unit (CPU)
Compact Disk (CD)
Compact Disk Read Only Memory (CD-ROM)
Conditional Access (CA)
Conditional Access System (CAS)
Customer Premises Equipment (CPE)
Digital Video Disk (DVD)
Digital Video Recorder (DVR)
Dynamic Random Access Memory (DRAM)
Erasable Programmable Read Only Memory (EEPROM)
Entitlement Control Message (ECM)
Entitlement Management Message (EMM)
Home Phoneline Networking Association (HomePNA)
Identification (ID)
Integrated Services Digital Network (ISDN)
Interactive Program Guide (IPG)
Internet Service Provider (ISP)
Local Area Network (LAN)
Maintenance Operations Console (MOC)
Motion Picture Experts Group (MPEG)
Network Interface Device (NID)
Network Personal Video Recorder (NPVR)
Network Video Recorder (NVR)
Optical/Electrical (O/E) interface
Optical Line Terminal (OLT)
Optical Network Terminal (ONT)
Passive Optical Network (PON)
Pay-Per-View (PPV)
Personal Video Recorder (PVR)
Primary Interexchange Carrier (PIC)
Public, Education and Government (PEG) programming
Public Switched Telephone Network (PSTN)
Read Only Memory (ROM)
Set-Top Box (STB)
Soft Network Interface Device (SNID)
Television (TV)
Super Headends (SHE)
Video Cassette Recorder (VCR)
Video Hub Office (VHO)
Video On Demand (VOD)
Video Serving Office (VSO)
Wavelength Division Multiplexing (WDM)

What is claimed is:

1. A recovery method for a video service provided through a broadband network, comprising:
   monitoring, exclusively by at least one device at a customer premises, a condition relating to power at the customer premises to automatically detect an unexpected power outage at the customer premises, the unexpected power outage causing an interruption in the video service within the customer premises;
   sending notice of the interruption through the network to a node having a video recorder in the network;

the sending of the notice of the interruption is initiated by the at least one device at the customer premises in response to the detected unexpected power outage;

recording, at the video recorder in the network and during the interruption caused by the unexpected power outage at the customer premises, a video program that was being viewed in the customer premises prior to the interruption, at least from a point in the video program substantially corresponding to a point when the interruption occurred; and after communication through the network with the customer premises is resumed after an end of the interruption, transmitting at least a portion of the recorded video program starting from the point substantially corresponding to the identified point when the interruption occurred, from the video recorder through the network to a video device within the customer premises, for presentation to a viewer.

2. The method of claim 1, wherein
the monitored condition relates to power supplied from a commercial power grid to the customer premises.

3. The method of claim 1, wherein the notice of the interruption includes identification data corresponding to at least one of the customer premises and the video device within the customer premises.

4. The method of claim 3, wherein the notice of the interruption further includes data identifying a point corresponding to when the interruption occurred.

5. The method of claim 4, wherein the data identifying the point corresponding to when the interruption occurred comprises a time stamp identifying a time at which the unexpected power outage was detected.

6. The method of claim 1, further comprising:
when communication through the network to the video device within the customer premises resumes after an end of the interruption, transmitting an offer to the viewer within the customer premises to resume the video program that was being viewed within the customer premises;
wherein the transmitting of at least a portion of the recorded video program to the video device within the customer premises is responsive to an acceptance of the offer by the viewer.

7. The method of claim 1, wherein:
the broadband network comprises a digital fiber-to-the-home network; and
the at least one device at the customer premises comprises a network interface device at an edge of the fiber-to-the-home network at the customer premises and that performs the monitoring and the sending of the notice.

8. The method of claim 7, wherein the video recorder is coupled to a node of the fiber-to-the-home network serving as a video headend or serving as a video hub office.

9. The method of claim 1, further comprising identifying the video program that was being viewed within the customer premises prior to the interruption.

10. The method of claim 9, wherein the recording commences at the video recorder from a point in the identified video program that substantially corresponds to a time when the interruption occurred, in response to receipt of the notice of interruption.

11. The method of claim 9, wherein:
the recording comprises continuously recording all of a plurality of video programs transported through the network, including the identified video program, from a time prior to the interruption, and the identified point when the interruption occurred and the identification of the video program are noted in response to receipt of the notice of interruption, for use in performing the transmitting of at least a portion of the identified video program from the video recorder through the network to the video device within the customer premises, for viewing by a viewer from the point substantially corresponding to the identified point when the interruption occurred.

12. An edge interface device for providing a communications interface between a customer premises and a digital broadband communication network, comprising:
a broadband network-side interface for two-way communications connection to a broadband medium at an edge of the digital broadband communication network;
a customer-side interface for connection to a customer premises medium, the customer-side interface providing two-way communication to and from a video device within the customer premises via the customer premises medium;
an internal link between the broadband network-side interface and the customer-side interface;
a programmable data processing system in communication with the interfaces for controlling operations of the interface device; and
programming for controlling operation of the programmable data processing system, for causing the interface device to perform steps comprising:
monitoring, exclusively at the customer premises, a condition relating to power at the customer premises to automatically detect an unexpected power outage at the customer premises, the unexpected power outage causing an interruption in a video service within the customer premises; and
sending notice of the detected interruption through the network to a node of the network having a video recorder for use in recording, during the interruption caused by the unexpected power outage, at least a portion of a program that was being viewed before the interruption and offering a viewer a later replay of the recorded at least a portion of the program that was being viewed before the interruption;
the sending of the notice of the interruption is initiated at the customer premises in response to the detected unexpected power outage.

13. The interface device of claim 12, wherein:
the monitored condition relates to power supplied from a commercial power grid to the customer premises.

14. The interface device of claim 13, wherein:
the interface device normally receives power from within the customer premises and receives battery backup power when power from within the customer premises fails; and
the detection of the unexpected power outage at the customer premises comprises detecting a switchover to battery backup power.

15. The interface device of claim 12, wherein the notice includes identification data corresponding to at least one of the customer premises and the video device within the customer premises.

16. The interface device of claim 15, wherein the notice further includes data identifying a point corresponding to when the interruption occurred.

17. The interface device of claim 16, wherein the data identifying the point corresponding to when the interruption occurred comprises a time stamp identifying a time at which the unexpected power outage was detected.

18. The interface device of claim 12, wherein the broadband network-side interface comprises an optical fiber interface for transmission and reception of optical signals to and from the digital broadband communication network.

19. The interface device of claim 18, wherein the interface device is implemented as an optical network terminal for connection to local passive optical network facilities of the digital broadband communication network.

20. A system for video recovery in event of an unexpected power outage impacting video service through a broadband communication network at a customer premises, the system comprising:
server equipment for connection at a node within the broadband communication network for recording a video program that was being viewed in the customer premises when the unexpected power outage occurred; and
an interface device at the customer premises and that provides a communications interface at an edge of the broadband communication network for the customer premises, wherein:
the interface device at the customer premises is configured to automatically detect the unexpected power outage and to send a notice message through the network upon detecting the unexpected power outage; and
the server equipment is configured to record, during the unexpected power outage, at least a portion of the video program in response to the notice message and to transmit the at least a portion of the recorded video program through the network to a video device within the customer premises, for viewing by a viewer from a point substantially corresponding to when the unexpected power outage occurred, after service resumes.

21. The system of claim 20, wherein the server equipment comprises a network video recorder configured to record the video program that was being viewed in the customer premises.

22. The system of claim 21, wherein the network video recorder is configured to record the video program that was being viewed from a point corresponding to when the unexpected power outage occurred in response to the notice message sent by the interface device.

23. The system of claim 21, wherein the network video recorder is configured to continuously record one or more programs including the video program that was being viewed and is configured to transmit the portion of the video program through the network to the video device within the customer premises after service resumes.

24. The system of claim 23, wherein the network video recorder is configured to continuously record a plurality of broadcast programs carried by the broadband communication network and is configured to transmit a recording of the video program that was being viewed in the customer premises when the unexpected power outage occurred from a point substantially corresponding to the point of interruption, after service resumes.

25. The system of claim 20, wherein the server equipment comprises a video on demand server configured to resume transmission of a video on demand program that was being viewed in the customer premises when the unexpected power outage occurred, upon resumption of service.

26. A method, comprising:
receiving, by a video decoder device within a customer premises, a video program associated with a video communication service provided through a broadband communications network;
providing, by the video decoder device within the customer premises, conditional access communications to a video hub office in the broadband communications network to obtain permission to access the video program, the conditional access communications indicating the video program accessed by the video decoder device;
monitoring, exclusively by an optical network terminal located at the customer premises and communicatively connected to the video decoder device, power at the customer premises to automatically detect an unexpected power outage at the customer premises impacting on the video communication service within the customer premises;
operating, by the optical network terminal, on battery backup power, during the detected power outage at the customer premises;
sending, by the optical network terminal, a notice message through the broadband communications network to the video hub device upon detecting the unexpected power outage, the notice message indicating the unexpected power outage and at least one of a customer premises identifier, an optical network terminal identifier, and a video decoder device identifier;
automatically identifying, by a processor at the video hub office and based on the notice message received from the optical network terminal and on the conditional access communications received from the video decoder device, the detected power outage and the video program affected by the power outage;
recording, at a network video recorder communicatively connected to the video hub office in the broadband communications network and during the power outage at the customer premises, the identified video program, at least from a point in the video program substantially corresponding to when the power outage occurred; and
after communication through the broadband communications network with the video decoder device is resumed after an end of the power outage, transmitting, by the video hub office, at least a portion of the recorded video program, starting from the point substantially corresponding to when the power outage occurred, through the broadband communications network to the video decoder device within the customer premises.

* * * * *